(12) United States Patent
Lee et al.

(10) Patent No.: US 9,704,133 B2
(45) Date of Patent: Jul. 11, 2017

(54) SYSTEM AND METHOD FOR EVALUATING JOURNAL

(71) Applicant: National Research Foundation of Korea, Daejeon (KR)

(72) Inventors: Sung-Jong Lee, Daejeon (KR); Kwisun Park, Daejeon (KR); Sang Deog Han, Daejeon (KR); Kyung Woo Lee, Daejeon (KR); Eun-Jong Cha, Daejeon (KR)

(73) Assignee: NATIONAL RESEARCH FOUNDATION OF KOREA, Daejeon (KR)

( * ) Notice: Subject to any disclaimer, the term of this patent is extended or adjusted under 35 U.S.C. 154(b) by 219 days.

(21) Appl. No.: 14/299,301

(22) Filed: Jun. 9, 2014

(65) Prior Publication Data

US 2015/0193520 A1    Jul. 9, 2015

(30) Foreign Application Priority Data

Jan. 9, 2014 (KR) .......................... 10-2014-0002812

(51) Int. Cl.
  *G06F 17/30* (2006.01)
  *G06Q 10/10* (2012.01)
(52) U.S. Cl.
  CPC .................................. *G06Q 10/10* (2013.01)
(58) Field of Classification Search
  CPC ........... G06F 17/2247; G06F 17/30029; G06F 17/30542; G06F 17/30592; G06F 17/30595; G06F 17/30864; G06F 17/30985; G06Q 30/02; G06Q 30/0201; G06Q 30/0203; G06Q 30/0241; G06Q 10/0639;
  (Continued)

(56) References Cited

U.S. PATENT DOCUMENTS

2007/0136084 A1*  6/2007  Takahashi ......... G06F 17/30867
                                                    705/306
2008/0288324 A1* 11/2008  Graczynski ....... G06F 17/30536
                                                    705/7.14

(Continued)

FOREIGN PATENT DOCUMENTS

KR       10-0958172 B1       5/2010
KR       10-1210449 B1      12/2012

*Primary Examiner* — Greta Robinson
(74) *Attorney, Agent, or Firm* — Lex IP Meister, PLLC

(57) ABSTRACT

A system and a method for objectively evaluating qualitative levels of academic journals in the field of science and engineering are disclosed. The system for evaluating journals includes: a winner or member's paper database which includes information of papers published by a researcher who is awarded a prize or elected to a member of the academy in the field of science and engineering; a journal database which includes information of papers published in journals to be evaluated; a winner or member's paper ratio evaluation section which calculates a winner or member's paper ratio for the journals by using the information of papers of the journal database and the information of papers of the winner or member's paper database; and a journal evaluation section which evaluates a degree of contribution of the journals in awarding the prize or electing to the member of the academy from the winner or member's paper ratio calculated by the winner or member's paper ratio evaluation section.

2 Claims, 3 Drawing Sheets

(58) Field of Classification Search
CPC ....... G06Q 10/06395; G06Q 10/06398; G06Q 10/10; G06Q 10/02; G06Q 10/0201
USPC ....... 707/600, 748, 751, 755, 758, 780, 790, 707/805; 705/1.1, 7.29, 7.32, 7.38, 7.41, 705/7.42, 14.16, 7.14, 14.72, 306, 326
See application file for complete search history.

(56) References Cited

U.S. PATENT DOCUMENTS

| | | | |
|---|---|---|---|
| 2009/0204469 A1* | 8/2009 | Markram | G06F 17/30722 705/326 |
| 2010/0153372 A1* | 6/2010 | Kim | G06F 17/30864 707/722 |
| 2011/0270847 A1* | 11/2011 | Etkin | G06F 17/3089 707/748 |
| 2013/0080266 A1* | 3/2013 | Molyneux | G06Q 10/00 705/14.72 |
| 2014/0032573 A1* | 1/2014 | Etkin | G06F 17/30289 707/751 |
| 2014/0087354 A1* | 3/2014 | Collier | G09B 7/02 434/353 |

* cited by examiner

SYSTEM AND METHOD FOR EVALUATING JOURNAL

This application claims the priority benefit of Korean Patent Application No. 10-2014-0002812 filed on Jan. 9, 2014. All disclosure of the Korean Patent application is incorporated herein by reference.

BACKGROUND OF THE INVENTION

Field of the Invention

This invention relates to a system and a method for evaluating journals, and more particularly, to a system and a method for objectively evaluating qualitative levels of academic journals in the field of science and engineering, and a medium recorded with a program for evaluating the journals.

Background Art

Generally, in the fields of science and engineering, researchers' performances are evaluated or verified with papers which have been published by the researchers. Worldwidely there are several tens of thousands academic journals in which papers of science and engineering fields are published, and each journal has its own reputation, reliability, popularity and scarcity. Therefore, it is considered that a qualitative level of a journal in which a paper is published represents or indicates a level of the paper.

As indexes for measuring a qualitative level of a journal in the fields of science and engineering, various indexes, such as SCI (Scientific citation Index), total citation, impact Factor (IF), h-index, eigen factor, etc have been developed. Among them, the most widely used index is the "Impact Factor (IF)" which is provided by Thomson Reuters Corporation. The Impact Factor (IF) is calculated by dividing "total citation number of a journal" with "total number of papers which are published in the journal". Thus, the Impact Factor (IF) is an index based on "a citation number per a paper" and evaluates a journal as a more influential journal as the journal is more frequently cited in other papers.

The qualitative level of a journal in which a researcher's paper is published greatly influences the researcher's reputation, promotion, a professor job application, participation to a government research project, and so on. Accordingly, it is greatly important for a researcher in the fields of science and engineering to properly evaluate and select a journal for publishing his or her paper. However, all the conventional indexes for evaluating journal are based on "a citation number of a paper". Therefore, the conventional indexes should be calculated on the basis of the citation number information which is exclusively provided by Thomson Reuters corporation.

PRIOR ART DOCUMENTS

Korean Patent No. 10-1210449 entitled "Method for evaluating marketability of research project, evaluation system thereof, and recording medium therefor"

Korean Patent No. 10-0958172 entitled "Method for evaluating value of technology, evaluation system thereof, and computer-readable medium with program for evaluating value of technology"

SUMMARY OF THE INVENTION

Accordingly, it is an object of the present invention to provide a system and a method for evaluating journal based on an independent database which is not based on a citation relation between papers, and a medium recorded with program for evaluating journal.

It is other object of the present invention to provide a system and a method for evaluating journals based on paper publication data of researcher who is awarded major prize or elected a member of a honorable academy in the field of science and engineering, and a medium recorded with program for evaluating journal.

It is another object of the present invention to provide a system and a method for objectively evaluating qualitative levels of journals in the field of science and engineering, especially in the field of basic science, and a medium recorded with program for evaluating journal.

To achieve these and other objects, the present invention provides a system for evaluating journals, comprising: a winner or member's paper database which includes information of papers published by a researcher who is awarded a prize or elected to a member of an academy in the field of science and engineering; a journal database which includes information of papers published in journals to be evaluated; a winner or member's paper ratio evaluation section which calculates a winner or member's paper ratio for the journals by using the information of papers of the journal database and the information of papers of the winner or member's paper database; and a journal evaluation section which evaluates a degree of contribution of the journals in awarding the prize or electing to the member of the academy from the winner or member's paper ratio calculated by the winner or member's paper ratio evaluation section.

Also, the present invention provides a method for evaluating journals, comprising the steps of: preparing a winner or member's paper database which includes information of papers published by a researcher who is awarded a prize or elected to a member of an academy in the field of science and engineering and a journal database which includes information of papers published in journals to be evaluated; calculating a winner or a member's paper ratio for the journals by using the information of papers of the journal database and the information of papers of the winner or member's paper database; and evaluating a degree of contribution of the journals in awarding the prize or electing to the member of the academy from the calculated winner or member's paper ratio.

The present invention further provides a computer-readable medium recorded with a program for implementing the method for evaluating a journal in a computer.

BRIEF DESCRIPTION OF THE DRAWINGS

The above and other objects, features and advantages of the present invention will be apparent from the following detailed description of the preferred embodiments of the present invention in conjunction with the accompanying drawings, in which.

DETAILED DESCRIPTION OF THE PREFERRED EMBODIMENT

The system and method for evaluating journals according to the present invention is for objectively evaluating qualitative levels of the academic journals. The system and method does not use paper citation information for evaluating journals, but evaluates journals on the basis of paper publication information of researchers who are awarded prize or elected a member of an academy in the field of science and engineering. The Nobel Prize is one of the well-known and reputational prizes in the field of science and engineering. The fields in which the Nobel Prize are awarded, include the basic science fields such as Physics, Chemistry, Physiology-Medicine, etc. The Nobel Prize is also awarded in non-scientific fields such as literature, politics and economics (for example, Nobel Peace Prizes), but the Nobel Prize in such fields are not considered in the present invention. The Nobel Prize is awarded to most leading researchers or scientists in each generation in the field of science and engineering. In some cases, textbooks or science history are re-written or revised in accordance with the research results of the Novel Prize winner (Nobel Laureate). Thus, the researchers awarded the Nobel prize are regarded as reputational and prominent researchers to other researchers and even to the public.

Figure 1:
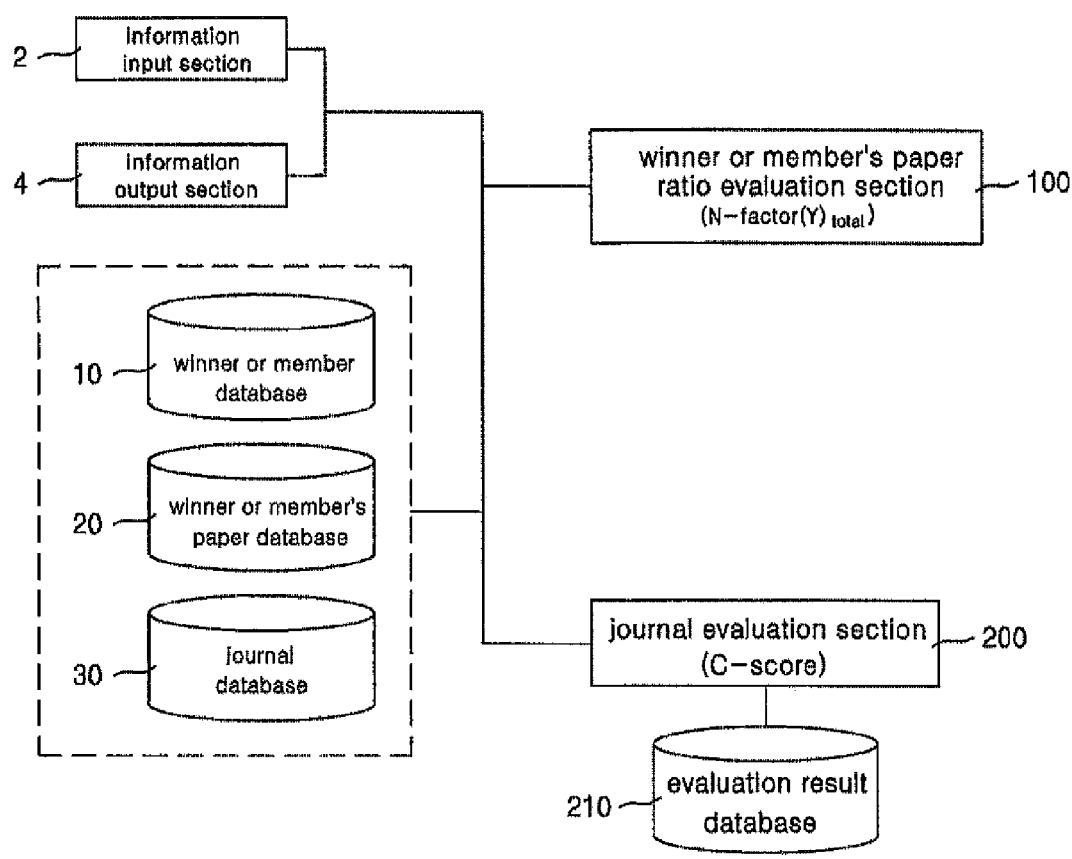
FIG. 1 illustrates a block diagram of a system for evaluating journals according to an embodiment of the present invention.

For these reasons, the papers published by the Nobel Prize winners can be regarded as representative, prominent and qualitatively important papers in its field, and a journal publishing a number of such papers can also be regarded as a representative, prominent and qualitatively important journal in its field. Accordingly, in the system and method of the present invention, a ratio of papers of prize winners or academy members in a journal is used to determine the qualitative level of the journal. FIG. 1 illustrates a block diagram of a system for evaluating journals according to an embodiment of the present invention. As shown in FIG. 1, the system for evaluating journals according to the present invention may comprise a winner or member database 10, a winner or member's paper database 20, a journal database 30, a winner or member's paper ratio evaluation section 100, and a journal evaluation section 200. In this specification, "the winner or member" represents the prize winner and/or the academy member, and, occasionally, can be abbreviated by a simple term such as "the winner" rather than "the winner or member".

The winner or member database 10 includes information of winners who are awarded prize or members who are elected to the academy in the field of science and engineering, and the winner or member database 10 can be used for calculating a ratio of papers of a certain prize winner or an academy member in journals. The information of winners or members may include the winner or member's name, award-winning or academy-electing record, nationality, graduate college name and so on. The prize or academy for preparing the winner or member database 10 is a prize or an academy which is useful for confirming researchers and scientist's reputation, and may include major, reputational, honorable and/or prominent prizes or academies in the field of science and engineering such as the Nobel Prize, the Wolf Prize, the Lasker Awards, the Abel Prize, the Fields Medals, the National Academy of Science (NAS), the National Academy of Engineering (NAE) etc. The prize or the academy for preparing the winner or member database 10 may be one prize such as the Nobel Prize or may be at least two prizes or academies such as NAS and NAE. For example, the winner or member database 10 includes prize or academy names and researchers' name awarding the prizes or electing to the academies. In case of the Nobel Prize, the total number of the Novel Prize winners is 566 by the year of 2013, and the winners' information is included in the winner database 10.

The winner or member's paper database 20 includes information of papers published by a researcher who is awarded the prize or elected to the member of the academy in the field of science and engineering, and preferably, whose information is included in the winner or member database 10. The information of papers in the winner or member's paper database 20 includes a name of journal in which the papers are published, volume thereof, author, publication date (year/month/date), published pages etc. In case of the Nobel Prize, the total number of papers of the Novel Prize winners is 64,155 by the year of 2013, and the papers' information is included in the winner's paper database 20. The journal database 30 includes information of papers published in journals to be evaluated, and the information of papers in the journal database 30 includes a name of journal in which the papers are published, volume thereof, author, publication date (year/month/date), published pages etc.

The winner or member's paper ratio evaluation section 100 calculates a winner or member's paper ratio for the journals by using the information of papers of the journal database 30 and the information of papers of the winner or member's paper database 20. For example, when the winner's paper database 20 is prepared for the papers of the Novel Prize winners, a factor corresponding the winner's paper ratio is calculated as shown in the following Equation 1, and the factor can be called as "N-factor", "N-factor(Y)$_{total}$", "Nobel Prize factor" or "prize factor" in this specification. More specifically, the prize factor is proportional to the winner's paper ratio as shown in Equation 1.

$$N\text{-factor}(Y)_{total} = \frac{\Sigma N(Y)}{\Sigma P_Y} \times k \qquad \text{[Equation 1]}$$

In Equation 1, $\Sigma N(Y)$ represents total number of papers published in a journal by the Nobel Prize winners until year (Y−1), $\Sigma P_Y$ represents total number of papers published in the journal until year (Y−1), and k is an integer as a weight value.

As shown in Equation 1, the Nobel Prize winner's paper ratio in a journal can be calculated by dividing "the total number of papers published in the journal by the Nobel Prize winners ($\Sigma N(Y)$)" by "the total number of papers published in the journal($\Sigma P_Y$)" for a predetermined period, for example, from the first journal publishing year to the present year (year Y, evaluation period). Like such, by calculating the ratio of the total number of prize winners' papers over the total number of papers published in a journal, it is possible to equitably compare the journals regardless of their size. In addition, for easy handling of the winner's paper ratio, it is preferable to calculate the N-factor by multiplying a predetermined weight value (k) to the winner's paper ratio. For example, when the weight value is 1,000, the N-factor having reduced decimal points can be obtained.

The N-factors are calculated for some reputational journals and are shown in the following Table 1 together with the IF (impact factor) provided by Thomson Reuters corporation. As shown in Table 1, for most of the reputational journals, the N-factors of the present invention are obtained to be high values, and there is high correlation between the N-factor and the IF.

TABLE 1

| Journals | IF | N-factor |
|---|---|---|
| Cell | 32.0 | 55.7 |
| Annu Rev Biochem | 27.7 | 53.7 |
| Proc Natl Acad Sci USA | 9.7 | 38.6 |
| J Exp Med | 13.2 | 34.5 |
| J Mol Biol | 3.9 | 32.4 |
| Neuron | 15.8 | 31.4 |
| J Gen Physiol | 4.7 | 29.8 |
| Phys Rev Lett | 7.9 | 28.1 |
| Nat New Biol | | 27.9 |
| Nature | 38.6 | 27.4 |
| Genes Dev | 12.4 | 25.0 |
| Phys Rev D Part Fields | 4.7 | 21.7 |
| J Cell Biol | 10.8 | 21.0 |
| EMBO J | 9.8 | 20.3 |
| J Chem Phys | 3.2 | 18.3 |
| J Biol Chem | 4.7 | 17.5 |
| Phys Rev A | 3.0 | 16.4 |
| J Physiol | 4.4 | 16.2 |
| J Am Chem Soc | 10.7 | 15.5 |
| Science | 31.0 | 15.0 |
| J Chem Soc | | 14.9 |
| Phys Rev B | 3.8 | 13.3 |
| Mol Cell Biol | 5.4 | 12.9 |
| Eur J Immunol | 5.0 | 11.4 |
| Biochemistry | 3.4 | 10.8 |
| Physical Review | | 10.7 |
| Biochem J | 4.7 | 9.7 |
| J Clin Invest | 12.8 | 9.5 |
| Virology | 3.4 | 9.0 |
| Br J Pharmacol | 5.1 | 8.1 |

The journal evaluation section 200 evaluates a degree of contribution of the journals in awarding or obtaining the prize or the membership from the winner or member's paper ratio (for example, N-factor) calculated by the winner's or the member's paper ratio evaluation section 100. For example, when the N-factors (namely, Noble prize winner's paper ratio) for various journals are obtained by the winner's paper ratio evaluation section 100, the journal evaluation section 200 calculates a degree of contribution of each journal (if necessary, hereinafter, "C-score" or "contribution-score") on the basis of the N-factor in order to evaluate the contribution of each journal for winning (awarding) the Nobel Prize and/or electing to the academy member. In specific examples, the degree of contribution is proportional to at least one of the winner's paper ratio(s) and the N-factor(s). Namely, the degree of contribution (C-score) represents the amount of contribution of a journal in winning a prize. Thereby, the journals can be ranked in series by the calculated degree of contribution.

In the method and system for evaluating journals according to the present invention, the journals can be evaluated by using at least two prizes or memberships. For example, when the winner's paper ratio evaluation section 100 calculates the winner's paper ratios for each journal for two prizes (for example, Nobel Prize and Wolf Prize), the journal evaluation section 200 calculates a degree of contribution of each journal(C-score) by multiplying a predetermined weight values(k1, k2) to the paper ratios (N-factor($Y$)$_{total}$, W-factor($Y$)$_{total}$) for prizes and adding the weighted paper ratios as shown in the following Equation 2.

$$C\text{-Score} = k1 * N\text{-factor}(Y)_{total} + k2 * W\text{-factor}(Y)_{total} \quad \text{[Equation 2]}$$

In Equation 2, N-factor($Y$)$_{total}$ is a Nobel prize factor corresponding to the paper ratio of the Nobel Prize winner obtained with Equation 1, W-factor($Y$)$_{total}$ is a Wolf prize factor corresponding to the paper ratio of the Wolf Prize winner obtained in the same manner with Equation 1, and k1 and k2 are the weight values for each prize. For instance, k1, the weight value of the Nobel Prize may generally be larger than k2, the weight value of the Wolf Prize. However, in some scientific field, k2 may be larger than k1.

As shown in FIG. 1, the system for evaluating journals according to the present invention may further include an information input section 2 and the information output section 4. The information input section 2 is an input device for establishing, updating or modifying various databases such as the winner or member database 10, the winner or member's paper database 20 and the journal database 30 etc., and inputting the weight values k1 and k2. Examples of the information input section 2 include typical input devices such as a keyboard, a mouse or an optical drives for reading large amount of information stored in the recording medium such CD, DVD etc. The information output section 4 provides a user with the evaluation results calculated by the system for evaluating journals of the present invention. Examples of the information output section 4 include conventional output devices such as a monitor, a printer etc. The evaluation result from the journal evaluation section 200 (degree of contribution of each journal, C-score) may be stored in an evaluation result database 210.

Figure 2:
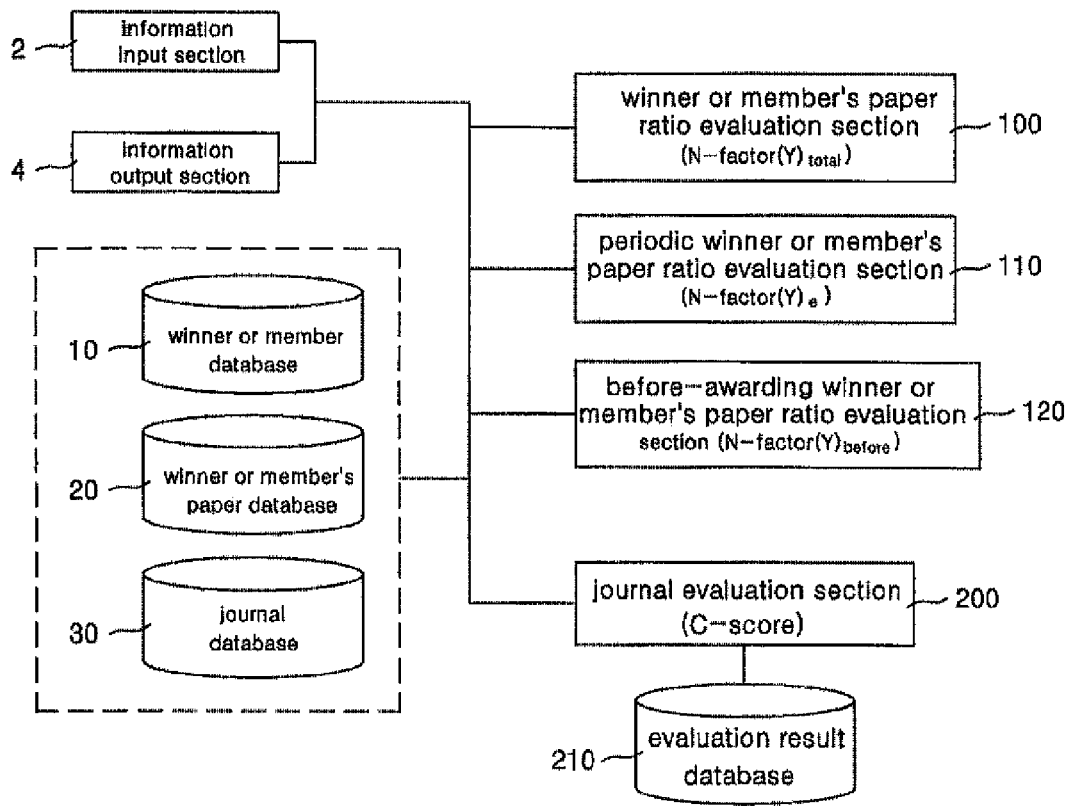
FIG. 2 illustrates a block diagram of a system for evaluating journals according to other embodiment of the present invention.

FIG. 2 illustrates a block diagram of a system for evaluating journals according to other embodiment of the present invention. The system in FIG. 2 has the same configuration with the system in FIG. 1 except for further having a periodic winner or member's paper ratio evaluation section 110 and/or a before-awarding winner or member's paper ratio evaluation section 120 besides the winner or member's paper ratio evaluation section 100.

The periodic winner or member's paper ratio evaluation section 110 calculates the winner or member's paper ratio for journals for a predetermined period, preferably, for a recent predetermined period by using the information of papers of the journal database 30 and the information of papers of the winner or member's paper database 20. For example, the Nobel Prize factor(N-factor($Y$)$_e$) for the recent e years(last 10 years, last 30 years, last 50 years, last 100 years, etc) can be calculated with the following Equation 3.

$$N\text{-factor}(Y)_e = \frac{\sum_{i=Y-e}^{Y-1} N_i}{\sum_{i=Y-e}^{Y-1} P_i} \times k \quad \text{[Equation 3]}$$

In Equation 3, $N_i$ represents the total number of papers published by the Nobel Prize winners in a journal in year i, $P_i$ represents the total number of papers published in the journal in the year i, and k is an integer as a weight value. The N-factor($Y$)$_e$ of Equation 3 is to evaluate the journal only with the recently published papers, which increase the reliability of the evaluation.

The before-awarding winner or member's paper ratio evaluation section 130 calculates the winner or member's paper ratio for journals with respect to the papers which were published before the prize is awarded or before the member election by using the information of papers of the journal database 30 and the information of papers of the winner or member's paper database 20. For example, a Nobel Prize factor before year b when the Nobel Prize is awarded (N-factor(Y)$_{before}$) can be calculated with the following Equation 4.

$$\text{N-factor}(Y)_{before} = \frac{\Sigma N_b(Y)}{\Sigma P_b} \times k \quad \text{[Equation 4]}$$

In Equation 4, $\Sigma N_b(Y)$ represents the total number of papers published by the Nobel Prize winner in a journal until the year b−1, $\Sigma P_b$ represents the total number of papers published in the journal until the year b−1, and k is an integer as a weight value. The N-factor(Y)$_{before}$ of Equation 4 is to evaluate the journal only with the papers which were published before the Nobel Prize award, which increase the reliability of the evaluation.

In the embodiment shown in FIG. 2, the journal evaluation section 200 calculates a degree of contribution of each journal(C-score) by multiplying a predetermined weight values(p1, p2, p3) to the winner's paper ratio(namely, N-factor(Y)$_{total}$) calculated by the winner's paper ratio evaluation section 100, the winner's paper ratio(namely, N-factor(Y)$_e$) calculated by the periodic winner's paper ratio evaluation section 110 and the winner's paper ratio(namely, N-factor (Y)$_{before}$) calculated by the before-awarding winner's paper ratio evaluation section 120 and adding the weighted paper ratios as shown in the following Equation 5.

C-Score=p1*N-factor(Y)$_{total}$+p2*N-factor(Y)$_e$+p3*N-factor(Y)$_{before}$     [Equation 5]

In Equation 5, p1, p2 and p3 represent weight values for each paper publication period, 'e' represents a period for calculating the winner's paper ratio for a predetermined recent period, for example, last 30 years. The weight values p1, p2 and p3 can be properly determined, preferably p2>p3>p1. As a specific example, p1 (the paper ratio for total years) is 1, p2 (the paper ratio for recent years) is 3, and p3 (the paper ratio before awarding) is 2.

Figure 3:
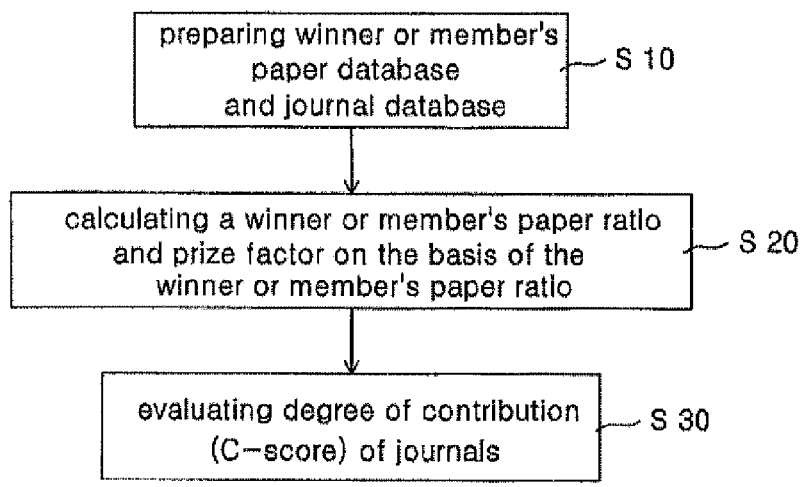
FIG. 3 is a flow chart for illustrating a method for evaluating journals according to an embodiment of the present invention.
Figure 4:
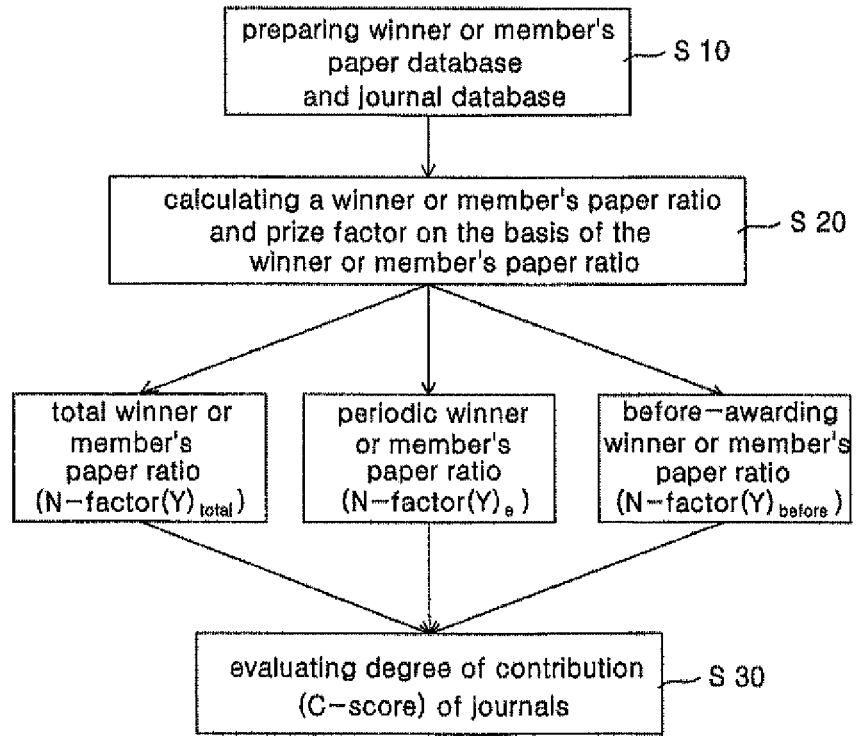
FIG. 4 is a flow chart for illustrating a method for evaluating journals according to other embodiment of the present invention.
Figure 5:
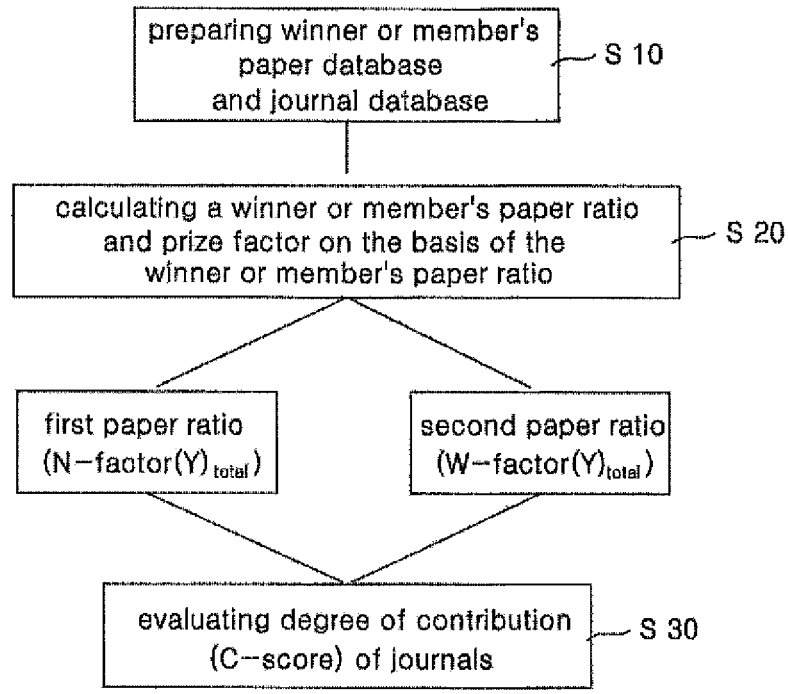
FIG. 5 is a flow chart for illustrating a method for evaluating journals according to another embodiment of the present invention.

Hereinafter, a method for evaluating journals according to the present invention will be explained with reference to FIGS. 3-5. FIG. 3 is a flow chart for illustrating a method for evaluating journals according to an embodiment of the present invention. As shown in FIG. 3, the method for evaluating journals comprises the steps of: preparing a winner or member's paper database which includes information of papers published by a researcher who is awarded a prize or is elected to an academy member in the field of science and engineering and a journal database which includes information of papers published in journals to be evaluated (S 10); calculating a winner or member's paper ratio for the journals by using the information of papers of the journal database and the information of papers of the winner or member's paper database (S 20); and evaluating a degree of contribution (contribution score) of the journals in awarding the prize from the calculated winner or member's paper ratio (S 30). If necessary, a prize factor, for example, Nobel prize factor, can be calculated on the basis of the winner's paper ratio, and the prize factor can be used for calculating the degree of contribution. As shown in FIG. 4, the prize factor or the academy factor may include at least one prize factor or academy factor selected from the group consisting of (a) a total prize factor or academy factor corresponding to the winner's or the member's paper ratio for the total period from the first journal publishing year to the present year (for example N-factor(Y)$_{total}$ in Equation 1), (b) a periodic prize factor or academy factor corresponding to the winner or member's paper ratio for a predetermined period (for example N-factor(Y)e in Equation 3), and (c) a before-awarding prize factor or academy factor corresponding to the winner or member's paper ratio for a period from the first journal publishing year to a prize awarding or an academy electing year (for example, N-factor(Y)before in Equation 4). Meanwhile, as shown in FIG. 5, the prize factor or the academy factor may include at least two different prize factors or academy factors which are calculated in relation to at least two prizes or academies. The degree of contribution (contribution score) is calculated by multiplying weight values to each prize factor or each academy factor and the winner or member's paper ratio and adding the weighted prize factors or academy factors and the winner or member's paper ratios (for example Equations 2 and 5).

In addition, the evaluation system and method of the present invention can be used for evaluating a researcher's research performance. The winner or member's paper ratio and the prize factor or the academy factor for a journal are the sum of each individual winner or member's paper ratio and the prize factor or the academy factor for the journal. For example, the Nobel Prize factor for all years for a journal ("N-factor(Y)$_{total}$") is the sum of each individual Nobel prize winner's Nobel Prize factor for all years for the journal. The Nobel Prize factor for recent e years for a journal("N-factor(Y)$_e$") is the sum of each individual winner's Nobel Prize factor for recent a years for the journal. Also, the Nobel Prize factor before year b for a journal("N-factor(Y)$_{before}$") is the sum of each individual winner's Nobel Prize factor before year b for the journal. In other words, for a journal, all Nobel Prize factors of all individual Nobel Prize winners (566 persons) are added to produce the Nobel Prize factor of the journal. The Nobel Prize factor of a journal represents a ratio of papers of the Nobel Prize winners in the journal. Thus, as the Nobel Prize factor increases for a journal, for a researcher who published a paper in the journal, it is reasonably assumed that the possibility of winning the Nobel Prize increases. An individual researcher may publish papers in more than one journal. In this case, the sum of the Nobel Prize factors of the journals in which the individual researcher publishes papers is proportional to the possibility of winning the Nobel Prize for the individual researcher. Accordingly, the sum of the Nobel Prize factors of various journals in which a researcher has published his or her papers is proportional to the possibility for the researcher to win the Nobel Prize. The sum of all Nobel Prize factors of the journals, in which an individual researcher has published his papers, can be called as "Nobel-Score (N-Score)" for the individual researcher. The Nobel-Score (N-Score) can be a quantitative indicator representing a possibility of wining the Nobel Prize for the individual researcher. If a researcher has published more than one paper in a journal, then, in calculating the N-score, the Nobel Prize factor of the journal is preferably weighted in proportion to the number of papers published in the journal by the researcher. For 566 Nobel Prize winners in each technical field, the average Nobel-Score (N-Score) are calculated and shown in the following Table 2 with the conventional IF values.

TABLE 2

|  | Physics | Chemistry | Physiology-Medicine | Total |
|---|---|---|---|---|
| Number of winner | 196 | 166 | 204 | 566 |
| Number of paper per Person | 58 | 126 | 156 | 113 |
| Number of SCI paper per Person | 46 | 57 | 51 | 51 |

TABLE 2-continued

|  | Physics | Chemistry | Physiology-Medicine | Total |
|---|---|---|---|---|
| Personal average IF | 10.6 | 13.8 | 26.2 | 17.3 |
| Personal average of sum of N-Factors (N-Score) | 999 | 2,303 | 2,376 | 1,878 |

As shown in Table 2, the personal N-Score of the Nobel Prize winners has close correlations with the personal SCI paper number and the personal average IF. Accordingly, according to one aspect of the present invention, a researcher's possibility of winning the Nobel Prize can be anticipated by comparing the average N-score of the Nobel Prize winner with the N-score of the researcher who have not won the Nobel Prize. For example, in the field of Chemistry, when the N-score of a scientist who have not won the Nobel Prize is larger than the personal average N-score (for example, 2303 points) of the Nobel Prize winners in Chemistry, it can be expected that the scientist's possibility of winning the Nobel Prize is high. Therefore, in the present invention, the possibility of winning a prize for a scientist who has published his or her papers in journals can be evaluated by using the evaluation result of the journals. In summary, in the present invention, an individual (prize) winner's or (academy) member's paper ratio for an individual winner or an academy member is calculated by using the information of papers of the journal database and the information of papers of the winner or member's paper database. Also, an individual researcher's paper ratio for an individual researcher who have not won the prize is calculated, and the individual winner or member's paper ratio and the individual researcher's paper ratio is compared to determine the possibility of winning the prize or electing to the academy member for the individual researcher.

The present invention also provides a computer-readable medium recorded with a program for performing the method for evaluating journals. The computer-readable medium includes program commands, data files, data structures, etc., alone or in combination thereof. The medium can be specially designed and constructed for the purposes of the present invention. Alternatively, conventional computer software or hardware can be used as the medium. The computer-readable medium includes hardware devices configured to store and perform program commands, and example thereof includes hard disks, magnetic media such as a floppy disk and a magnetic tape etc, optical recording medium such as a CD-ROM or DVD or a flash memory. Program commands recorded on the recording medium include, for example, machine code created by a compiler, high-level language code which can be run on the computer using an interpreter, etc.

The evaluation system and method according to the present invention can be used for calculating other prize factors or academy factors (for example W-factor for the Wolf Prize) for other major science prizes or academies including the Wolf Prize, the Lasker Awards, the Abel Prizes, the National Academy of Science, the National Academy of Engineering etc, in addition to the N-factor for the Nobel Prize. The contribution-score (C-score) of the journals is obtained from these prize factors together with the N-factor, so the journals can be more reliably evaluated. With the evaluation method of journals of the present invention, the contribution of a paper published in a journal in winning the Nobel Prize can be calculated. Therefore, by evaluating journals in accordance with the present invention, the probability of winning the Nobel Prize can be increased by effectively selecting journals for paper publication. In accordance with the present invention, an indicator for evaluating the achievements of basic research can also be provided. When the journals are evaluated with new standards of the N-factor and the N-Score of the present invention, qualitative levels of the papers or research achievements which are published in the journals can be properly evaluated without using the conventional indexes such as IF (impact factor) of Thomson Reuters corporation which have been exclusively used for paper evaluations for more than 40 years.

The system and method for evaluating journals according to the present invention is based on the new database which is not using the citation data but is using paper publication data of prize winners or academy members, so the qualitative level of journals in the field of science and engineering can be objectively evaluated. The system and method of the present invention fairly and properly evaluates journals, and may provide the standard criteria for selecting the journals for paper publication.

What is claimed is:

1. A system for evaluating journals, comprising:
a winner or member's paper database which includes information of papers published by a researcher who is awarded a prize or is elected to an academy member in the field of science and engineering;
journal database which includes information of papers published in journals to be evaluated;
a winner or member's paper ratio evaluation section which calculates a winner or member's paper ratio for the journals for all years from a first journal publishing year to a present year by using the information of papers of the journal database and the information of papers of the winner or member's paper database;
a periodic winner or member's paper ratio evaluation section which calculates a winner or member's paper ratio for the journals for a predetermined period by using the information of papers of the journal database and the information of papers of the winner or member's paper database;
a before-awarding winner or member's paper ratio evaluation section which calculates a winner or member's paper ratio for the journals with respect to the papers which were published before the prize is awarded or the academy member is elected by using the information of papers of the journal database and the information of papers of the winner or member's paper database; and
a journal evaluation section which evaluates a degree of contribution of the journals in awarding the prize or electing the academy member from the winner or member's paper ratio for all years from a first journal publishing year to a present year, a winner or member's paper ratio for a predetermined period, and the winner or member's paper ratio for the journals with respect to the papers which were published before the prize is awarded or the academy member is elected calculated by the winner or member's paper ratio evaluation section, the periodic winner or member's paper ratio evaluation section, and the before-awarding winner or member's paper ratio evaluation section, respectively.

2. The system for evaluating journals according to claim 1, wherein the journal evaluation section calculates the degree of contribution of each journal by multiplying a predetermined weight values to the winner or member's paper ratio calculated by the winner or member's paper ratio evaluation section, the winner or member's paper ratio calculated by the periodic winner's paper ratio evaluation section, and the winner or member's paper ratio calculated by the before-awarding winner or member's paper ratio evaluation section and adding the weighted paper ratios.

* * * * *